United States Patent
Farmer (10) Patent No.: US 9,127,606 B2
(45) Date of Patent: Sep. 8, 2015

(54) SYSTEM FOR DETERMINING EGR DEGRADATION

(75) Inventor: Mary Catherine Farmer, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1164 days.

(21) Appl. No.: 12/908,453

(22) Filed: Oct. 20, 2010

(65) Prior Publication Data

US 2012/0096855 A1   Apr. 26, 2012

(51) Int. Cl.
*F02D 41/00* (2006.01)
*F02M 25/07* (2006.01)
*F02D 41/22* (2006.01)
*F02D 41/14* (2006.01)

(52) U.S. Cl.
CPC .......... *F02D 41/0072* (2013.01); *F02D 41/221* (2013.01); *F02M 25/0702* (2013.01); *F02M 25/0731* (2013.01); *F02M 25/0738* (2013.01); *F02M 25/0754* (2013.01); *F02D 41/1446* (2013.01); *F02D 2041/007* (2013.01); *F02D 2041/0067* (2013.01); *F02M 25/0727* (2013.01); *F02M 25/0728* (2013.01); *Y02T 10/47* (2013.01)

(58) Field of Classification Search
CPC .......... F02M 25/0737; F02M 25/0756; F02M 25/0702; F02M 25/0754; F02M 25/0726; F02M 25/0732; F02B 29/0437; F02B 29/0418; F02D 41/221; F02D 41/22
USPC ........ 73/114.74, 114.68; 123/568.12, 568.16, 123/568.21, 568.22, 568.31, 563; 701/107, 701/108, 114, 115; 702/183
See application file for complete search history.

(56) References Cited

U.S. PATENT DOCUMENTS

| | | | |
|---|---|---|---|
| 4,164,206 A * | 8/1979 | Toelle | 123/568.27 |
| 5,014,203 A * | 5/1991 | Miyazaki et al. | 701/108 |
| 5,732,688 A * | 3/1998 | Charlton et al. | 123/568.12 |
| 6,085,732 A * | 7/2000 | Wang et al. | 123/568.12 |
| 6,446,498 B1 * | 9/2002 | Schricker et al. | 73/114.74 |
| 6,681,171 B2 * | 1/2004 | Rimnac et al. | 701/108 |
| 6,687,601 B2 * | 2/2004 | Bale et al. | 701/108 |
| 6,837,226 B2 * | 1/2005 | Wang et al. | 123/568.16 |
| 6,848,434 B2 * | 2/2005 | Li et al. | 123/568.12 |
| 7,079,938 B2 * | 7/2006 | Bhargava et al. | 701/108 |
| 7,251,555 B2 * | 7/2007 | Kimura | 701/108 |
| 7,983,834 B2 * | 7/2011 | Blumendeller | 701/114 |
| 8,028,569 B2 * | 10/2011 | Blumendeller et al. | 73/114.74 |
| 8,140,246 B1 * | 3/2012 | Manchanda | 701/107 |
| 2003/0041845 A1 * | 3/2003 | Akao et al. | 123/568.16 |
| 2003/0114978 A1 * | 6/2003 | Rimnac et al. | 701/108 |
| 2004/0084030 A1 * | 5/2004 | Matsunaga et al. | 123/568.12 |
| 2004/0182373 A1 * | 9/2004 | Li et al. | 123/568.12 |
| 2006/0042608 A1 * | 3/2006 | Buck et al. | 123/568.12 |
| 2008/0264081 A1 * | 10/2008 | Crowell et al. | 62/132 |

(Continued)

FOREIGN PATENT DOCUMENTS

WO   2010/013123 A1   2/2010

*Primary Examiner* — Lindsay Low
*Assistant Examiner* — George Jin
(74) *Attorney, Agent, or Firm* — Julia Voutyras; Alleman Hall McCoy Russell & Tuttle LLP (57) ABSTRACT

A system for improving operation of an EGR system is presented. The system provides distinct models to estimate EGR temperature in response to a valve position. In one example, the system can judge EGR system operation when a state of a control valve is adjusted during driving conditions.

20 Claims, 4 Drawing Sheets

(56) References Cited

U.S. PATENT DOCUMENTS

2008/0264609 A1* 10/2008 Lutz et al. ............... 165/104.19
2009/0101122 A1* 4/2009 Kurtz et al. .............. 123/568.12
2010/0242929 A1* 9/2010 Kardos et al. ............ 123/568.12
2010/0286960 A1* 11/2010 Ringeisen .................... 702/183
2010/0307231 A1* 12/2010 Allard et al. ............... 73/114.74

* cited by examiner

SYSTEM FOR DETERMINING EGR DEGRADATION

FIELD

The present description relates to a method and system for improving operation and diagnosis of an exhaust gas recirculation (EGR) system. The approach may be particularly useful for engines that have cooled EGR.

BACKGROUND AND SUMMARY

EGR has long been provided to engines to control NOx emissions and reduce engine pumping work. EGR can lower engine pumping work by raising intake manifold pressure. EGR can lower NOx emissions by reducing peak in-cylinder combustion temperatures. More recently, EGR systems have started to cool EGR to further reduce in-cylinder combustion temperatures, thereby further reducing engine NOx emissions. However, cooled EGR is not necessary at all engine operating conditions and therefore some EGR systems provide both unconditioned and cooled EGR.

Although EGR systems can help to lower engine emissions and improve engine operation by providing both unconditioned and cooled EGR, such systems also provide challenges as to determining whether or not the system is operating as is desired. For example, it may be difficult under some conditions to determine whether or not control valves are positioned as is desired to provide the requested cooled or unconditioned EGR. Some EGR systems include a model against which measured engine operating conditions are compared so as to determine whether or not the EGR system is operating as is desired. However, adjusting a position of a two state cooler control valve can cause discontinuities in some modeled systems so that it may be difficult to assess whether or not operation of the EGR system is degraded. If the discontinuities caused by switching a cooler control valve are not properly processed, false positive or false negative indications of EGR system degradation may result.

The inventor herein has recognized the above-mentioned disadvantages and has developed a method for monitoring an EGR system. One example of the present description includes a method for monitoring an EGR system, comprising: indicating EGR system degradation in response to a first EGR gas temperature model when a valve is commanded to a first position; and indicating EGR system degradation in response to a second EGR gas temperature model when the valve is commanded to a second position.

By providing separate and different models of EGR system behavior for each valve position, it is possible to better estimate EGR system behavior at least during some conditions. In one example, a model is provided to estimate EGR gas temperature downstream of an EGR cooler when a valve is commanded to a position where EGR gas is directed to the EGR cooler. A second model is provided to estimate EGR gas temperature downstream of the EGR cooler when the valve is commanded to a second position bypassing the EGR cooler. By providing separate models of different portions of the EGR system, it is possible to limit the effect that valve switching may have on individual models since the models can continue to estimate system parameters independent of valve position.

The present description may provide several advantages. In particular, the approach can improve model based parameter estimates since discontinuities that may be caused by switching a two state valve may not significantly influence the estimates provided by separate models. Further, the approach may be simpler to implement since all system dynamics do not have to be integrated into a single model to arrive at a desired model output. Further still, the present approach may simplify model calibration.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
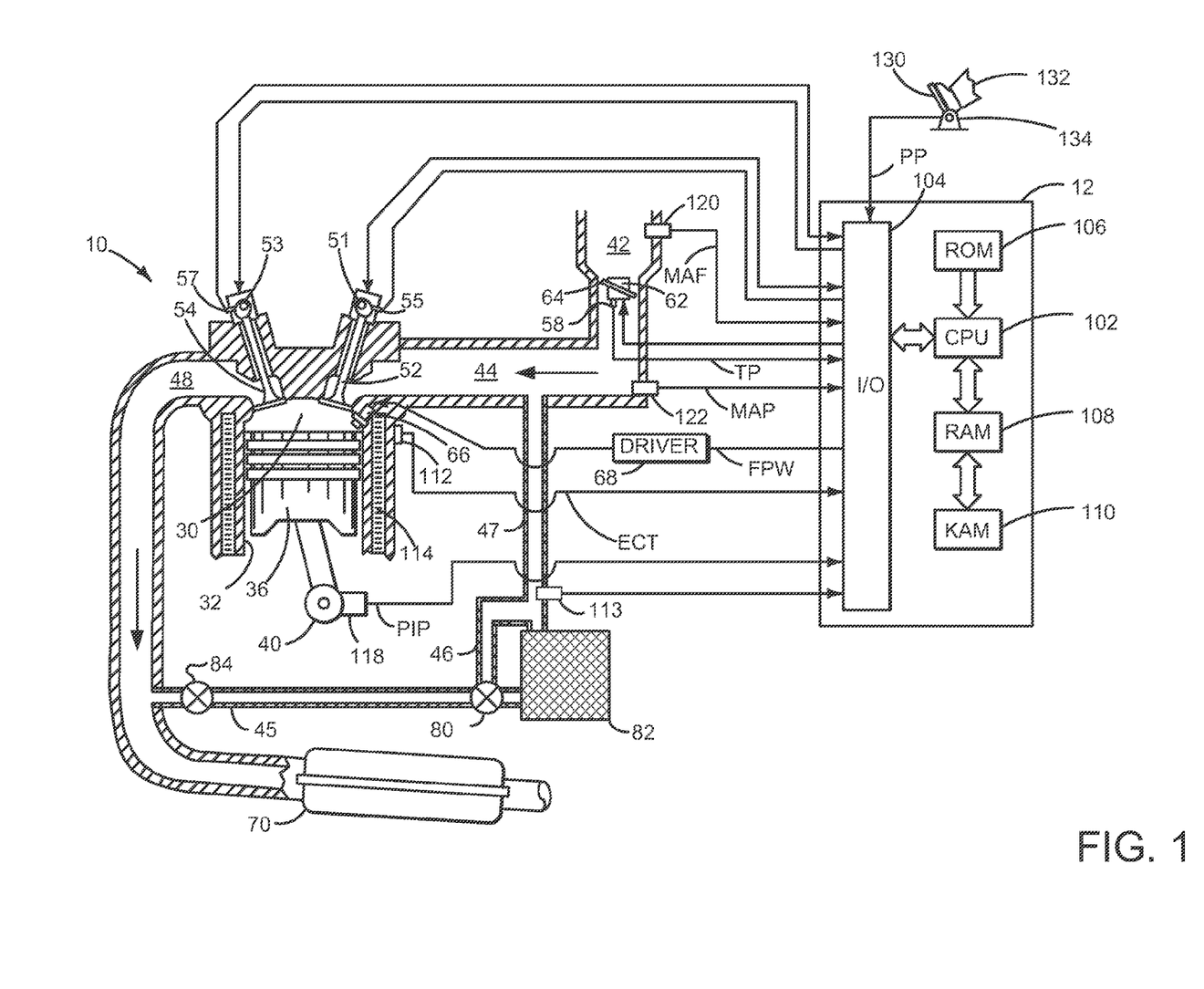
FIG. 1 is a schematic diagram of an engine.
Figure 2:
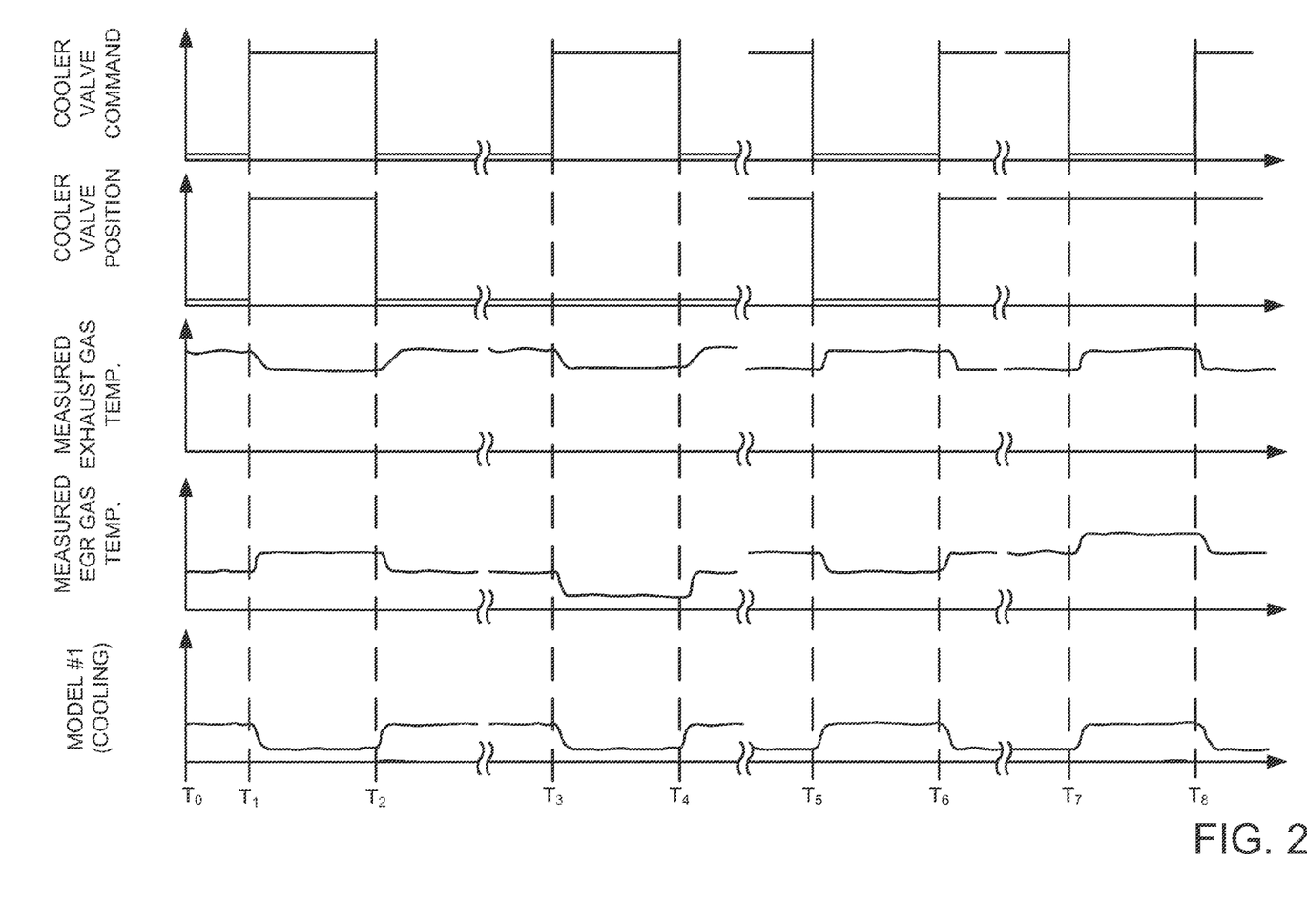
FIG. 2 is a schematic diagram of simulated signals of interest when operating an EGR system.
Figure 3:
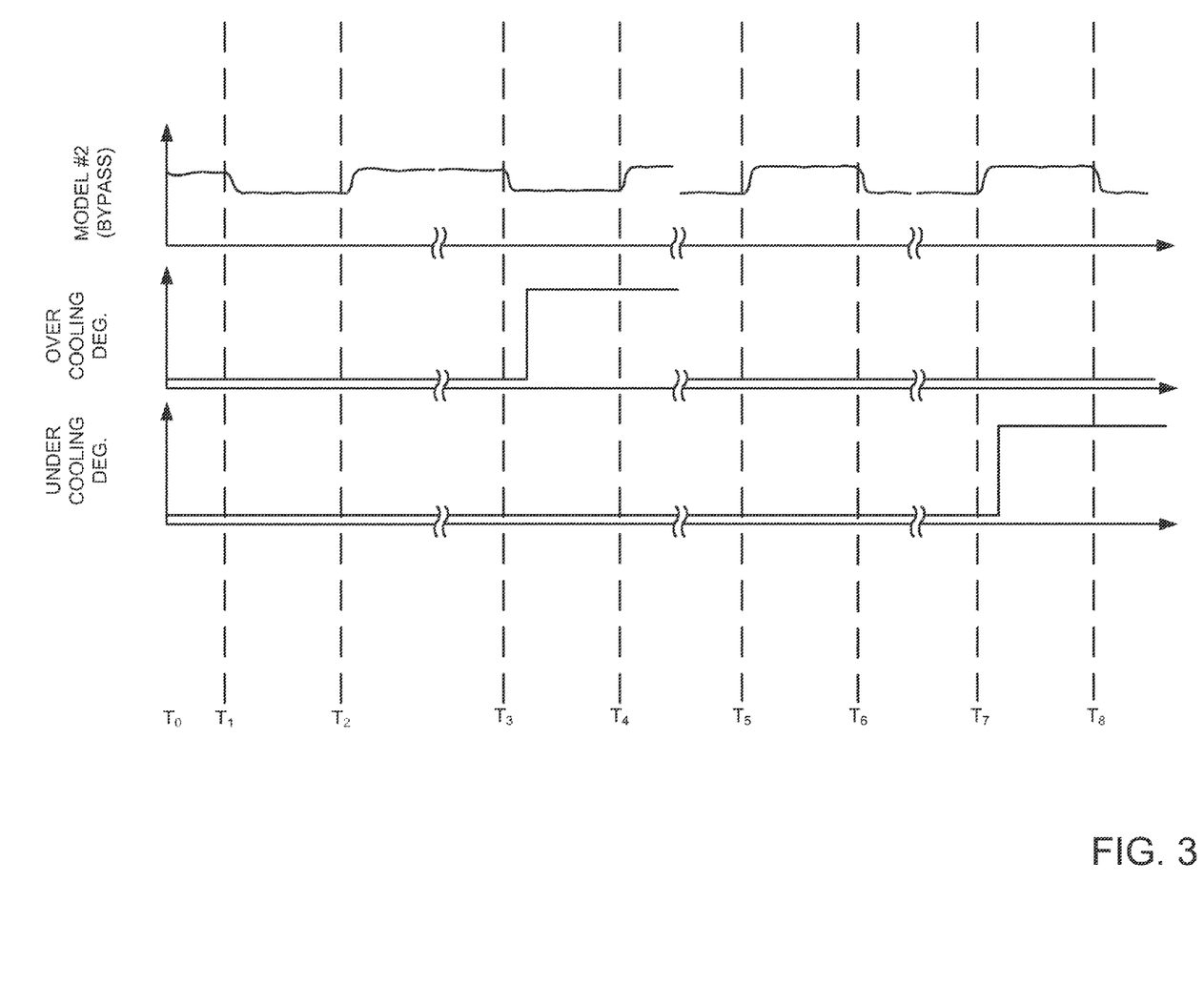
FIG. 3 is a schematic diagram of additional simulated signals of interest when operating an EGR system as shown in FIG. 2.

The present description is related to monitoring and determining degradation of an EGR system. In one example, the EGR system is adapted to a diesel engine as shown in FIG. 1. However, the present description may provide benefits for gasoline and alternative fuel engines as well. Accordingly, this disclosure is not limited to a particular type of engine or a particular EGR system configuration. FIGS. 2-3 show simulated signals of interest when an engine and EGR system are operated according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, in some engines, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure dual stage fuel system is used to generate higher fuel pressures.

An air-fuel mixture in combustion chamber 30 may be combusted via compression ignition. For example, fuel may be injected several times during the compression stroke, as the piston approaches top-dead-center compression the air-fuel mixture in the cylinder ignites and the expanding gases drive the piston toward crankshaft 40. Exhaust gases exit combustion chamber 30 into exhaust manifold 48 and flows in the direction of the arrow. Some exhaust gases may be routed to EGR passage 45 when EGR valve 84 is at least partially open. EGR gas entering EGR passage 45 may be routed to bypass passage 46 or to EGR cooler 82 before entering downstream EGR passage 47. Cooler valve 80 is configured to route EGR gases through cooler 82 when not electrically energized by controller 12. Cooler valve 80 routes EGR gases through bypass passage 46 when energized by controller 12. In one example, the engine may be turbo-charged or supercharged to provide pressurized air or boost to the engine to increase engine output. EGR may be delivered upstream and/or downstream of the compressor turbine.

In alternative examples, a distributorless ignition system (not shown) provides an ignition spark to combustion chamber 30 via spark plug (not shown) in response to controller 12. Further, a universal Exhaust Gas Oxygen (UEGO) sensor (not shown) may be coupled to exhaust manifold 48 upstream of after treatment device 70.

After treatment device 70 can include an oxidation catalyst, particulate matter filter, reduction catalyst, or a three way catalyst in gasoline applications. In some examples, additional oxygen sensors may be located downstream of after treatment device 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of EGR temperature from temperature sensor 113; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure and exhaust temperature may also be sensed (sensors not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, ignition of the air-fuel mixture is via compression ignition while in other examples ignition is by way of a spark plug. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for an engine system, comprising: an EGR cooler; an EGR cooler bypass circuit; a valve configured to direct EGR gases to the EGR cooler in a first state, the valve configured to direct EGR gases to bypass the EGR cooler in a second state; and a controller, the controller including instructions to measure a temperature of EGR gases in an EGR passage downstream of the EGR cooler and the EGR cooler bypass circuit, the controller including further instructions for indicating EGR degradation when the measured temperature of EGR gas is outside of a predetermined first threshold temperature range from a second EGR model temperature estimate when the valve is commanded to the second state. The engine system further comprises instructions for the controller to compare the measured temperature of EGR gas with a predetermined second threshold temperature range from a first EGR model temperature estimate when the valve is commanded to the first state. The engine system further comprises instructions to indicate the valve is stuck in the first state when the temperature of the EGR gas is outside of the first threshold temperature range. The engine system further comprises instructions to indicate the valve is stuck in the second state when the temperature of the EGR gas is outside of the second threshold temperature range. The engine system further comprises a temperature sensor located in an EGR path downstream of the EGR cooler. The engine system includes where the EGR cooler includes a higher temperature coolant circuit and lower temperature coolant circuit.

Referring now to FIGS. 2 and 3, schematic diagrams of simulated signals of interest when operating an EGR system are shown. Each plot of FIGS. 2 and 3 includes several breaks in the X-axis indicating a separation in time. Time increases from the left to right. Thus, the events to the right of a brake occur later in time as compared to the events to the left of a brake. Further, the engine operating conditions on the different sides of the brake may be completely different.

The first plot from the top of FIG. 2 shows a control command signal for a cooler valve (e.g., valve 80 of FIG. 1). The X-axis represents time and time increases from the left to the right. The Y-axis represents the cooler valve command signal. The EGR cooler valve is energized when the signal is at a higher level and de-energized when at a lower level. The cooler valve directs exhaust gas to a cooler when de-energized. The cooler valve directs exhaust gas to a bypass passage that directs EGR gases around the cooler when the EGR valve is energized.

The second plot from the top of FIG. 2 shows a position signal for a cooler valve. The X-axis represents time and time increases from the left to the right. The Y-axis represents the cooler valve position. The cooler valve directs exhaust gas to an EGR cooler when the valve position is at the lower level. The cooler valve directs exhaust gas to a bypass passage when the valve position is at the higher level. The X-axis represents time and time increases from the left to the right.

The third plot from the top of FIG. 2 shows a measured exhaust gas temperature. However, in some examples, exhaust gas temperature may be estimated from engine air flow, injection timing, and engine load. The X-axis represents time and time increases from the left to the right. The Y-axis represents exhaust gas temperature and exhaust gas temperature increases in the direction of the Y-axis arrow.

The fourth plot from the top of FIG. 2 shows a measured EGR gas temperature. The EGR gas temperature is the temperature of exhaust gases that are downstream of the bypass line and the cooler. The X-axis represents time and time increases from the left to the right. The Y-axis represents EGR gas temperature and EGR gas temperature increases in the direction of the Y-axis arrow.

The fifth plot from the top of FIG. 2 shows an estimated EGR gas temperature from a first model. In one example, the first model includes an EGR cooler. The X-axis represents time and time increases from the left to the right. The Y-axis represents the estimated EGR gas temperature at a position in the EGR passage downstream of the EGR cooler and bypass passage, and EGR gas temperature increases in the direction of the Y-axis arrow. The first model estimates the temperature of EGR gases that have flowed through the EGR cooler. In one example, EGR gas temperature is based on the temperature of exhaust gases, a higher level engine coolant temperature, EGR mass flow rate, and cooler valve position. In particular, an empirically determined cooling efficiency is stored in a table that is indexed with exhaust temperature and EGR mass flow rate. The cooling efficiency is adjusted based on the position of the cooler valve, and the adjusted cooling efficiency is multiplied by the difference between the higher level engine coolant temperature and the EGR gas temperature to provide an estimate of a temperature reduction. The estimated temperature reduction is subtracted from the engine exhaust gas temperature to provide an estimate of the cooled EGR temperature. The cooled EGR temperature is filtered via a first order low pass filter.

The first plot from the top of FIG. 3 shows an estimated EGR gas temperature from a second model. The X-axis represents time and time increases from the left to the right. The Y-axis represents the estimated EGR gas temperature at a position in the EGR path downstream of the EGR cooler and bypass passage, and EGR gas temperature increases in the direction of the Y-axis arrow. The second model estimates the temperature of EGR gases that have flowed through the EGR cooler bypass. Similar to the first model, the second model estimates EGR gas temperature based on the temperature of exhaust gases and EGR mass flow rate. An empirically determined cooling efficiency of the cooling bypass passage is stored in a table that is indexed with exhaust temperature and EGR mass flow rate. The exhaust gas temperature is multiplied by a cooling efficiency to provide an amount of EGR cooling amount. The EGR cooling amount is subtracted from the exhaust gas temperature to provide an EGR temperature. The EGR temperature is filtered via a first order low pass filter.

The second plot from the top of FIG. 3 shows an over cooling degradation flag output from the first model (e.g., the EGR cooler model). The X-axis represents time and time increases from the left to the right. The Y-axis represents the state of an EGR degradation flag. The flag is not asserted at the lower level. The flag is asserted at the higher level. The lower level indicates no degradation. The higher level indicates EGR degradation is present. In particular, over cooling of EGR is present.

The third plot from the top of FIG. 3 shows an under cooling degradation flag that is output from the second model (e.g., the EGR bypass passage model). The X-axis represents time and time increases from the left to the right. The Y-axis represents the state of an EGR degradation flag. The flag is not asserted at the lower level. The flag is asserted at the higher level. The lower level indicates no degradation. The higher level indicates EGR degradation is present. In particular, under cooling of EGR is present.

At time $T_0$, the EGR cooler valve command is at a lower level. The EGR cooler valve command is adjusted according to engine operating conditions. For example, the position of the EGR cooler valve command is varied depending on engine speed and engine load. Further, the EGR cooler valve command may be varied in response to engine coolant temperature and ambient temperature. When the EGR cooler command is at the lower level it is desired that the EGR cooler valve route engine exhaust gases to the EGR cooler. Thus, the EGR gases are at least expected to be cooled when the EGR cooler command is at the lower level. The EGR cooler valve position follows the EGR cooler valve command from $T_0$ to $T_1$. Thus, the EGR cooler valve responds according to the EGR cooler valve command and engine exhaust gases are routed from the engine through the EGR cooler before entering the engine intake manifold. The measured exhaust gas temperature from time $T_0$ to time $T_1$ is shown at a middle level. During some conditions, the engine exhaust gas temperature may be relatively high when the cooler valve is commanded to direct engine exhaust gas through the EGR cooler, for example while the engine is operating at higher load conditions. The measured EGR gas temperature between time $T_0$ and time $T_1$ is lower than the measured engine exhaust gas temperature since the engine exhaust gases are cooled as they flow through the EGR cooler. The temperature at which EGR gas exits the cooler may vary depending on engine coolant temperature, EGR flow rate, and exhaust gas temperature. The temperature output of the first EGR gas temperature model (cooling model) is close to the measured EGR gas temperature, and the temperature output of the second EGR gas temperature model (bypass model) is greater than the measured EGR gas temperature. When the EGR cooler valve is commanded to direct exhaust gases to the EGR cooler, the system compares the measured EGR gas temperature against the EGR temperature estimated by the first EGR gas temperature model. If the temperatures are outside a predetermined temperature range of each other a under cooling degradation flag is asserted. Since there is little difference between the temperature output from the first EGR gas temperature model and the measured EGR gas temperature, the under cooling degradation flag is not asserted.

At time $T_1$, the EGR cooler command is changed to a higher level. The EGR cooler valve command is adjusted to a higher level so that unconditioned (e.g., exhaust gases that have not been cooled) EGR gases bypass the EGR cooler and can be directed to the engine. The EGR cooler valve position is shown following the EGR cooler valve command signal which indicates that the EGR cooler valve is responding as is requested. The measured engine exhaust gas temperature is shown decreasing indicating that the engine is operating at a lower engine load. Further, the measured EGR gas temperature is shown increasing since engine exhaust gases are bypassing the EGR cooler. The change in EGR gas temperature after $T_1$ occurs relatively quickly since there is little delay of exhaust gas flow when exhaust gas flows through the EGR cooler valve. The output of the first EGR gas temperature model decreases after $T_1$ because the engine exhaust is cooler and because the first EGR gas temperature model predicts a temperature of exhaust gases that have flowed through the cooler. On the other hand, the estimated EGR gas temperature from the second EGR gas temperature model is closer to the measured EGR gas temperature. The system compares the measured EGR gas temperature against the EGR temperature estimated by the second EGR gas temperature model when the cooler valve is commanded to the bypass position. If the measured EGR gas temperature and the temperature output from the second EGR gas temperature model are outside of a predetermined temperature range, the over cooling degradation flag is asserted. Since there is little difference between the measured EGR gas temperature and the temperature output from the second EGR gas temperature model between time $T_1$ and $T_2$, the over cooling degradation flag is not asserted.

It should be mentioned that in some examples, the outputs of the first and second models are not compared to the sensed or measured EGR gas temperature for a predetermined amount of time after a change in the cooler valve command occurs. Thus, the outputs of the first and second EGR gas temperature models have time to converge to the sensed or measured EGR gas temperature. Further, in some examples, the temperature estimate from the first model (e.g., cooler model) can be adjusted in response to an amount of time that the cooler valve is placed in a bypass state. For example, if the cooler valve is placed in the bypass state for a short period of time (e.g., a first period of time), the EGR gas temperature estimate from the first model may have a small EGR temperature adjustment (e.g., a small decrease in EGR temperature). On the other hand, if the cooler valve is placed in the bypass state for a longer period of time (e.g. a first period of time), the EGR gas temperature estimate from the first model may have a larger EGR temperature adjustment (e.g., a larger decrease in EGR temperature). Thus, the output of the first temperature model and the under cooling degradation flag may be related to and adjusted for the amount of time that the EGR cooling valve is in the bypass state. When the cooler valve is in the bypass state, gases in the cooler may have additional time to cool so that the exhaust gases may cool more as compared to when the gases are flowing through the cooler. Consequently, the EGR temperature models can adjust an estimated EGR gas temperature for a latency time that the EGR gases spend in the cooler. In addition, in the case where the EGR cooler is comprised of two temperature zones (e.g., where in one zone a higher temperature coolant extracts heat from exhaust gases and a lower temperature coolant extracts heat from exhaust gases) the first EGR gas temperature model may compensate EGR gas temperature based on the volume of EGR gas and the latency time the EGR gases are exposed to higher temperature coolant. Further, the first EGR gas temperature model may compensate EGR gas temperature based on the volume of EGR gas and the latency time the EGR gases are exposed to lower temperature coolant. Thus, the first EGR gas temperature model can compensate for the EGR cooler cooling zone and the latency time that the exhaust gases are exposed to the particular cooling zone.

At time $T_2$, the EGR cooler command is again lowered. Thus, the EGR gases are at least expected to be cooled when the EGR cooler command is at the lower level. The EGR cooler valve position also moves lower indicating that the EGR valve is following the EGR cooler valve command. The measured exhaust gas temperature increases in response to a change in engine operating conditions that facilitated the change in the EGR cooler valve command. The measured EGR gas temperature decreases as exhaust gases once again begin to flow through the cooler. The output of the first EGR gas temperature model differs little from the measured EGR gas temperature. As such, the under cooling degradation flag output is not asserted to indicate EGR degradation.

At time $T_3$, the EGR cooler valve command is again transitioned to a higher level. However, the EGR cooler valve position signal indicates that the position of the EGR cooler valve is not following the EGR cooler valve command. Thus, the EGR cooler valve is stuck in a de-energized state. The measured EGR gas temperature decreases because the exhaust gas temperature decreases and because the exhaust gases continue to flow through the EGR cooler. The temperature output from the second EGR gas temperature model and the measured EGR gas temperature are compared and found to be outside of a predetermined temperature range of one another. In one example, a predetermined amount of time is provided between when the EGR cooler valve command changes state and when the comparison between the temperature output from the second EGR gas temperature model and the measured EGR gas temperature is made. However, in this example, even after the predetermined amount of time, the disagreement of temperatures between the second EGR gas temperature model and the measured EGR gas temperature remains. Therefore, the EGR over cooling degradation flag is asserted to indicate EGR system degradation. The EGR over cooling degradation flag may remain asserted until cleared by a technician or until the EGR cooler valve is determined to be operating properly for a predetermined number of executions of a method (e.g., method 400 of FIG. 4).

At time $T_4$, the EGR cooler valve command is transitioned to a lower level. The position of the EGR cooler valve remains in the de-energized state. There is little difference between the measured EGR gas temperature and the estimated EGR gas temperature from the first EGR gas temperature model. As such, the under cooling degradation flag remains not asserted and provides no indication of EGR system degradation. However, the over cooling degradation flag remains asserted and continues to indicate EGR system degradation.

Between time $T_4$ and time $T_5$, the over cooling degradation flag is cleared indicating no EGR system degradation before time $T_5$. In addition, the cooler valve is put in a low state before the brake in time between $T_4$ and $T_5$, but after the brake the cooler valve is in a higher state. Thus, before time $T_5$, the cooler valve is bypassing the cooler.

At time $T_5$, the EGR cooler valve command is transitioned from a higher state to a lower state. The EGR cooler valve position signal follows the EGR cooler valve command. The measured exhaust gas temperature also increases indicating that the engine is being operated at a higher load condition than before time $T_5$. The measured EGR gas temperature decreases as cooled exhaust gas is sensed downstream of the EGR cooler. The EGR gas temperature output of the first EGR gas temperature model is within a predetermined temperature range of the measured EGR gas temperature. Therefore, the under cooling degradation flag is not asserted at $T_5$.

At time $T_6$, the EGR cooler valve command transitions to a higher state and the EGR cooler valve position signal also transitions to the higher level indicating that the EGR cooler valve is in the energized state where the EGR cooler is bypassed. The gas temperature output from the second EGR gas temperature model is within a predetermined temperature range of the sensed EGR gas temperature after T6. Therefore, the over cooling degradation flag is not asserted.

At time $T_7$, the EGR cooler valve command is transitioned from a higher level to a lower level. The EGR cooler valve position does not follow the EGR cooler valve command, thereby indicating that the EGR cooler valve is stuck in the energized state where the EGR gas bypasses the EGR cooler. Since the EGR cooler valve remains in the activated or bypass state, the temperature output from the first EGR gas temperature model disagrees with the sensed or measured EGR gas temperature by more than a predetermined temperature amount. A predetermined amount of time is provided between when the EGR cooler valve command changes state and when the comparison between the first EGR gas temperature model temperature output and the measured EGR gas temperature is performed. Even after the predetermined amount of time, the temperatures are outside of a predetermined temperature range of each other. Therefore, the under cooling EGR degradation flag is asserted shortly after $T_6$ to indicate EGR system degradation. Thus, when a the temperature output from the first EGR gas temperature model and the measured EGR gas temperature outside of a predetermined temperature range of each other, a degradation flag can be asserted.

At time $T_8$, the EGR cooler valve command is transitioned from a lower level to a higher level. The EGR cooler valve position matches the EGR cooler valve command at this time. The temperature output of the second EGR gas temperature model is within a predetermined temperature range of the measured EGR gas temperature. Consequently, the over cooling EGR flag is not asserted. However, the under cooling EGR degradation flag remains asserted since the flag has not been cleared by a clear command from a technician for example.

Figure 4:
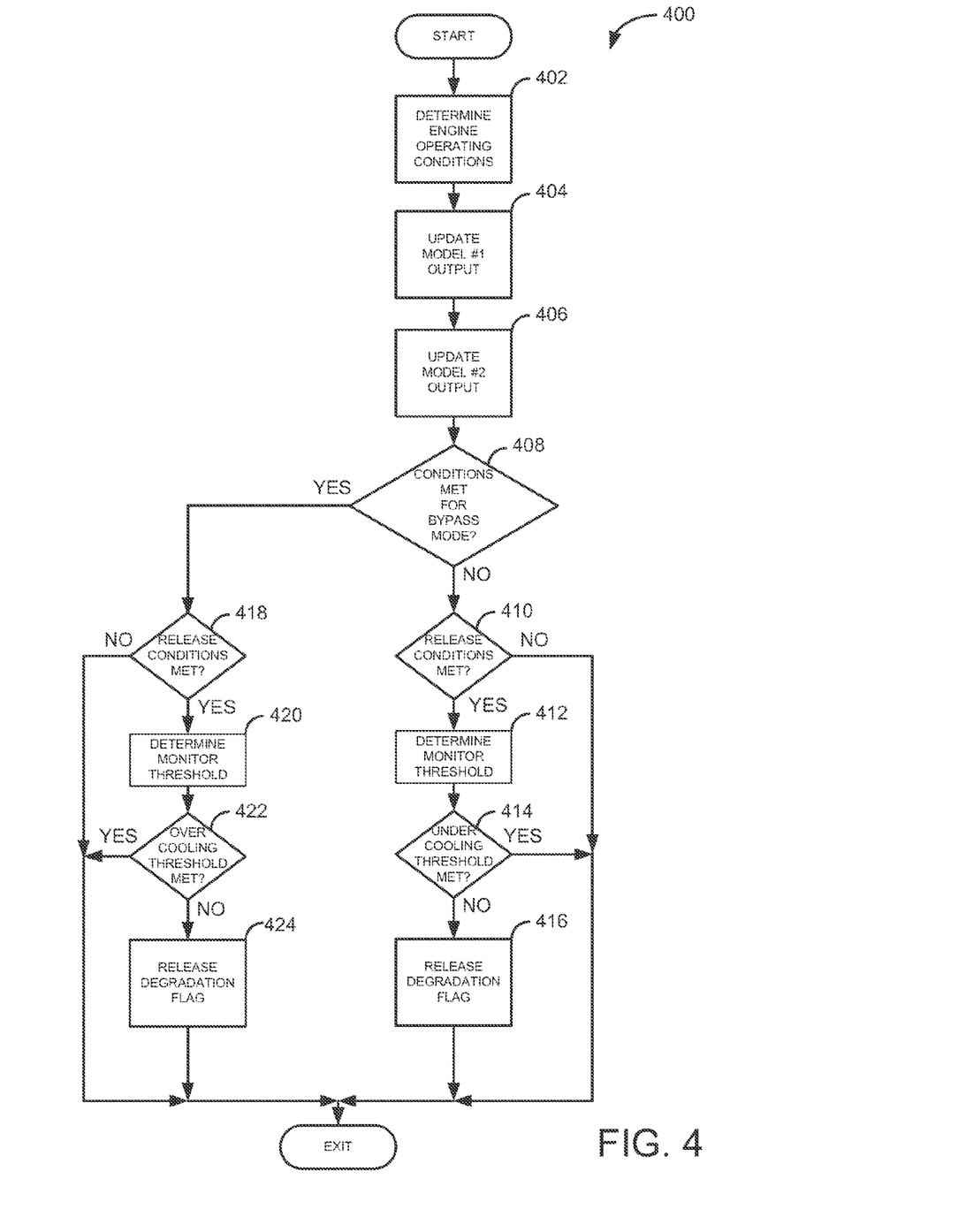
FIG. 4 is a flowchart of a method for monitoring an EGR system.

Referring now to FIG. 4, a flowchart of a method for monitoring an EGR system is shown. In one example, the controller of FIG. 1 contains instructions for executing method 400.

At 402, method 400 determines engine operating conditions. Engine operating conditions include but are not limited to engine temperature, engine load, engine speed, ambient air temperature, boost pressure, EGR gas temperature, exhaust gas temperature, and throttle position. Method 400 proceeds to 404 after engine operating conditions are determined.

At 404, method 400 updates the output of the first EGR gas temperature model. The first and second EGR gas temperature models are updated each time method 400 is executed. In one example, the first and second EGR gas temperature models estimate EGR gas temperature from empirically determined tables and a first order filter. For example, the first EGR gas temperature model estimates EGR gas temperature based on exhaust temperature, high coolant temperature, EGR mass flow rate, and EGR cooler valve position. The EGR gas temperature determined from the tables is filtered via a first order filter and output.

At 406, method 400 updates the output of the second EGR gas temperature model. In one example, the second EGR gat temperature estimation model may be of the same form as the first EGR gas temperature estimation model except that the second EGR gas temperature model tables are populated with empirically determined values that are based on the bypass loop.

At 408, method 400 judges whether or not conditions are met for bypassing EGR gases past the EGR cooler. In one example, EGR cooler gases bypass the EGR cooler in response to engine load. For example, at lower engine speeds and loads EGR gases may bypass the EGR cooler. If method 400 judges to pass EGR gases to the intake manifold via the EGR cooler, method 400 commands the EGR cooler valve to a deactivated state and proceeds to 410. Otherwise, method 400 commands the EGR cooler valve to an activated state and proceeds to 418. The EGR cooler valve directs EGR gases though the EGR cooler in the deactivated state and directs EGR gases through the EGR cooler bypass in the activated state. However, the system may be configured in a complementary manner if desired.

At 410, method 400 judges whether or not release conditions are met. In one example, the release conditions may be a particular engine speed and load range. For example, one release condition may be between 2000-2200 RPM and 0.3-0.35 engine load. If method 400 judges release conditions are met, method 400 proceeds to 412. Otherwise, method 400 proceeds to exit without asserting the under cooling degradation flag for the first EGR gas temperature model.

At 412, method 400 determines the monitor threshold for under cooling. In one example, a calibrated scalar may be the basis for the monitor threshold. In other examples, a table of different threshold values that are indexed by engine speed and load may be used to establish the under cooling monitor threshold. The under cooling threshold may be a range of temperature that the EGR gas temperature output from the first EGR has to be within for the under cooling degradation flag to not be asserted. Method 400 proceeds to 414 after the under cooling threshold is determined.

At 414, method 400 judges whether or not over the under cooling threshold condition is met. If the measured EGR gas temperature is not within the threshold range of the output from the first EGR gas temperature model, method 400 proceeds to 416. Otherwise, method 400 proceeds to exit.

At 416, method 400 asserts the under cooling degradation flag. In one example, the under cooling degradation flag may be provided to a vehicle operator via a light. In some examples the under cooling degradation flag may be asserted immediately when under cooling is determined. In other examples, the under cooling condition may have to be present for a predetermined amount of time before the under cooling degradation flag is asserted. Method 400 proceeds to exit after the under cooling degradation flag is asserted.

At 418, method 400 judges whether or not release conditions are met. In one example, the release conditions may be a particular engine speed and load range. If method 400 judges release conditions are met, method 400 proceeds to 420. Otherwise, method 400 proceeds to exit without asserting the over cooling degradation flag for the second EGR gas temperature model.

At 420, method 400 determines the monitor threshold for over cooling. In one example, a calibrated scalar may be the basis for the monitor threshold. In other examples, a table of different threshold values that are indexed by engine speed and load may be used to establish the over cooling monitor threshold. The over cooling monitor threshold may be a range of temperature that the EGR gas temperature output from the second EGR has to be within for the over cooling degradation flag to not be asserted. Method 400 proceeds to 422 after the over cooling threshold is determined.

At 422, method 400 judges whether or not over the over cooling threshold condition is met. If the measured EGR gas temperature is not within the threshold range of the output from the second EGR gas temperature model, method 400 proceeds to 424. Otherwise, method 400 proceeds to exit.

At 424, method 400 asserts the over cooling degradation flag. In one example, the over cooling degradation flag may be provided to a vehicle operator via a light. In some examples the over cooling degradation flag may be asserted immediately when over cooling is determined. In other examples, the over cooling condition may have to be present for a predetermined amount of time before the over cooling degradation flag is asserted. Method 400 proceeds to exit after the under cooling degradation flag is asserted.

Thus, FIG. 4 provides for a method for monitoring an EGR system, comprising: indicating EGR system degradation in response to a first EGR model when a valve is commanded to a first position; and indicating EGR system degradation in response to a second EGR model when the valve is commanded to a second position. The method includes where the valve directs EGR gas flow through or around an EGR cooler. The method further comprises comparing an output of the second EGR model to an output of a sensor and providing the indication of EGR system degradation when a temperature indicated by the sensor is outside a predetermined threshold temperature of the output of the second EGR model. The method further comprises comparing an output of the first EGR model to the output of the sensor and providing the indication of EGR system degradation when the temperature indicated by the sensor is outside a predetermined threshold temperature of the output of the first EGR model. The method includes where EGR gas is flowing when the valve is commanded to the first or second positions. The method further comprises providing the indication of EGR system degradation after release conditions are met. The method includes where an output of the second EGR model is compared to a measured EGR gas temperature when the valve is commanded to the second position, and where the second position bypasses an EGR cooler. The method includes where an output of the first EGR model is compared to a measured EGR gas temperature when the valve is commanded to the first position, and where the first position directs EGR gas to an EGR cooler.

The method of FIG. 4 also provides for a method for monitoring EGR, comprising: indicating degradation of a EGR cooler bypass valve in response to a downstream EGR gas temperature during switching of a position of the EGR cooler bypass valve, including basing the indication on different conditions of flow through a bypass passage and flow through a EGR cooler. The method further comprises basing the indication on an amount of time the EGR cooler bypass valve is positioned to bypass an EGR cooler. The method includes where the indication is further based on ambient air temperature. The method includes where the indication is further based on an EGR flow rate. The method includes where the EGR cooler includes a higher temperature coolant passage and a lower temperature coolant passage. The method includes where the downstream EGR gas temperature is compared to an estimated EGR gas temperature.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine system, comprising:
an EGR cooler;
an EGR cooler bypass circuit;
a valve configured to direct EGR gases to the EGR cooler in a deactivated state, the valve configured to direct EGR gases to bypass the EGR cooler in an activated state; and
a controller including instructions stored in non-transitory memory for a method for indicating EGR system degradation in response to a first EGR model when the valve is deactivated, a temperature output from the first EGR model adjusted when the valve is deactivated in response to an amount of time the valve is activated, and indicating EGR system degradation in response to a second EGR model when the valve is activated.

2. The engine system of claim 1, where the valve directs EGR gas flow through or around the EGR cooler, and further comprising additional instructions for adjusting the temperature output from the first model in response to a high temperature zone and a low temperature zone of the EGR cooler.

3. The engine system of claim 1, further comprising additional instructions for comparing the temperature output of the second EGR model to an output of a temperature sensor and providing the indication of EGR system degradation when a temperature indicated by the temperature sensor is outside a predetermined threshold temperature of the temperature output of the second EGR model.

4. The engine system of claim 3, further comprising additional instructions for comparing a temperature output of the first EGR model to the output of the temperature sensor and providing the indication of EGR system degradation when the temperature indicated by the temperature sensor is outside a predetermined threshold temperature of the temperature output of the first EGR model.

5. The engine system of claim 1, where EGR gas is flowing through the valve when the valve is activated or deactivated, and where the controller includes additional instructions for updating temperature outputs of the first EGR model and the second EGR model each time a method for monitoring an EGR system is executed.

6. The engine system of claim 1, further comprising additional instructions for providing the indication of EGR system degradation after a release condition is met.

7. The engine system of claim 1, further comprising additional instructions for comparing where temperature output of the second EGR model to a measured EGR gas temperature when the valve is activated.

8. The engine system of claim 1, further comprising additional instructions for comparing the temperature output of the first EGR model to a measured EGR gas temperature when the valve is deactivated.

9. An engine system, comprising:
an EGR cooler;
an EGR cooler bypass circuit;
a valve configured to direct EGR gases to the EGR cooler in a deactivated state, the valve configured to direct EGR gases to bypass the EGR cooler in an activated state; and
a controller including instructions stored in non-transitory memory for a method for indicating degradation of an EGR cooler bypass valve in response to a modeled EGR gas temperature estimate for exhaust gas flowing through the EGR cooler during switching of a position of the EGR cooler bypass valve, including basing the indication on different conditions of flow through a bypass passage and flow through the EGR cooler, and where the modeled EGR gas temperature estimate is adjusted in response to an amount of time the EGR cooler bypass valve is directing exhaust gas around the EGR cooler.

10. The engine system of claim 9, further comprising additional instructions for basing the indication based on an amount of time the EGR cooler bypass valve is positioned to bypass the EGR cooler.

11. The engine system of claim 10, where the indication is further based on ambient air temperature, and where the controller includes additional instructions for updating temperature outputs of the modeled EGR gas temperature estimate and a second EGR model each time a method is executed.

12. The engine system of claim 11, where the indication is further based on an EGR flow rate.

13. The engine system of claim 10, where the EGR cooler includes a higher temperature coolant passage and a lower temperature coolant passage.

14. The engine system of claim 9, where the modeled EGR gas temperature estimate is compared to an over cooling gas temperature.

15. An engine system, comprising:
an EGR cooler;
an EGR cooler bypass circuit;
a valve configured to direct EGR gases to the EGR cooler in a deactivated state, the valve configured to direct EGR gases to bypass the EGR cooler in an activated state; and
a controller, the controller including instructions to measure a temperature of EGR gases in an EGR passage downstream of the EGR cooler and the EGR cooler bypass circuit, the controller including further instructions for indicating EGR degradation when the measured temperature of EGR gas is outside of a predetermined first threshold temperature range from a second EGR model temperature estimate when the valve is commanded to the activated state, and the controller including further instructions for adjusting a temperature output from a first EGR model in response to an amount of time the valve is activated when the valve is deactivated, the temperature output of the first EGR model and a temperature output of a second EGR model is updated each time a method for monitoring an EGR system is executed.

16. The engine system of claim 15, further comprising instructions for the controller to adjust the temperature output from the first EGR model in response to a high temperature zone and a low temperature zone of the EGR cooler.

17. The engine system of claim 15, further comprising instructions to indicate the valve is stuck in the deactivated state when the measured EGR gas temperature is outside of the first threshold temperature range.

18. The engine system of claim 16, further comprising instructions to indicate the valve is stuck in the activated state when the EGR gas temperature is outside of a second threshold temperature range.

19. The engine system of claim 15, further comprising a temperature sensor located in an EGR path downstream of the EGR cooler.

20. The engine system of claim 15, where the EGR cooler includes a higher temperature coolant circuit and lower temperature coolant circuit.

* * * * *